United States Patent
Lee et al.

(10) Patent No.: US 10,056,645 B2
(45) Date of Patent: Aug. 21, 2018

(54) ELECTROLYTE, LITHIUM BATTERY AND LITHIUM METAL BATTERY INCLUDING THE SAME, AND METHOD OF PREPARING THE ELECTROLYTE

(71) Applicant: Samsung Electronics Co., Ltd., Suwon-si, Gyeonggi-do (KR)

(72) Inventors: Yonggun Lee, Incheon (KR); Yooseong Yang, Yongin-si (KR); Jenam Lee, Seongnam-si (KR); Hongsoo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 225 days.

(21) Appl. No.: 14/799,102

(22) Filed: Jul. 14, 2015

(65) Prior Publication Data
US 2016/0013515 A1    Jan. 14, 2016

(30) Foreign Application Priority Data

Jul. 14, 2014 (KR) ........................ 10-2014-0088458

(51) Int. Cl.
*H01M 2/00* (2006.01)
*H01M 10/0565* (2010.01)
(Continued)

(52) U.S. Cl.
CPC ....... *H01M 10/0565* (2013.01); *H01M 4/134* (2013.01); *H01M 4/382* (2013.01);
(Continued)

(58) Field of Classification Search
CPC ...... H01M 4/134; H01M 4/382; H01M 4/405; H01M 2300/0082; H01M 2300/0085;
(Continued)

(56) References Cited

U.S. PATENT DOCUMENTS 8,445,140 B2 *  5/2013  Bertin ................. C08F 293/005
                                                        429/304
2009/0263725 A1  10/2009  Balsara et al.
(Continued)

FOREIGN PATENT DOCUMENTS

JP    2001247741 A    9/2001
JP    2011222354 A    11/2011
(Continued)

OTHER PUBLICATIONS

Inna Gurevitch, et al., "Nanocomposites of Titanium Dioxide and Polystyrene-Poly(ethylene oxide) Block Copolymer as Solid-State Electrolytes for Lithium Metal Batteries", Journal of the Electrochemical Society, 160 (9), A1611-A1617 (2013).
(Continued)

*Primary Examiner* — Cynthia H Kelly
*Assistant Examiner* — Monique M Wills
(74) *Attorney, Agent, or Firm* — Cantor Colburn LLP

(57) ABSTRACT

An electrolyte including a block copolymer having a first domain and a second domain covalently linked to the first domain, an ionic liquid, an oligomer, an inorganic particle, and a lithium salt, wherein the first domain includes an ion conductive polymer block, and the second domain includes a non-conducting polymer block.

19 Claims, 8 Drawing Sheets

(51) Int. Cl.
  *H01M 4/134* (2010.01)
  *H01M 4/38* (2006.01)
  *H01M 4/40* (2006.01)
  *H01M 10/052* (2010.01)
  *H01M 2/16* (2006.01)

(52) U.S. Cl.
  CPC ......... *H01M 4/405* (2013.01); *H01M 10/052* (2013.01); *H01M 2/1653* (2013.01); *H01M 2/1673* (2013.01); *H01M 2300/0082* (2013.01); *H01M 2300/0085* (2013.01); *H01M 2300/0094* (2013.01)

(58) Field of Classification Search
  CPC ..... H01M 2300/0094; H01M 10/0565; H01M 2/1673; H01M 10/052; H01M 2/1653
  See application file for complete search history.

(56) References Cited

U.S. PATENT DOCUMENTS

| | | |
|---|---|---|
| 2010/0092870 A1 | 4/2010 | Shembel et al. |
| 2010/0239918 A1 | 9/2010 | Pratt et al. |
| 2011/0206994 A1 | 8/2011 | Balsara et al. |
| 2012/0002349 A1* | 1/2012 | Ito ................ H01G 11/58 361/502 |
| 2012/0312695 A1 | 12/2012 | Bose |
| 2013/0236764 A1 | 9/2013 | Hu et al. |
| 2016/0248100 A1* | 8/2016 | Joo ................ H01M 4/405 |

FOREIGN PATENT DOCUMENTS

| | | |
|---|---|---|
| JP | 201380701 A | 5/2013 |
| KR | 100813242 B1 | 3/2008 |
| KR | 101028970 B1 | 4/2011 |
| KR | 1020110135933 A | 12/2011 |
| KR | 1020120109905 A | 10/2012 |
| KR | 101247596 B1 | 3/2013 |
| KR | 101284176 B1 | 7/2013 |
| KR | 101340600 B1 | 12/2013 |
| KR | 101389732 B1 | 4/2014 |
| KR | 101455799 B1 | 10/2014 |
| WO | 2013169370 A1 | 11/2013 |

OTHER PUBLICATIONS

Morten Wetjen, et al., "Composite Poly(ethylene oxide) Electrolytes Plasticized by N-Alkyl-N-butylpyrrolidinium Bis (trifluorornethane-sulfonyl)imide for Lithium Batteries", ChemSusChem 2013, 6, 1037-1043.

Renaud Bouchet, et al., "Single-ion BAB triblock copolymers as highly efficient electrolytes for lithium-metal batteries", Nature Materials, vol. 12, May 2013, pp. 452-457.

S. Liu, et al., "Effect of co-doping nano-silica filler and N-methyl-N-propylpiperidinium bis(trifluoromethanesulfonyl) imide into polymer electrolyte on Li dendrite formation in Li/poly(ethylene oxide)-Li(CF3SO2)2N/Li", Journal of Power Sources 196 (2011) 7681-7686.

* cited by examiner

ELECTROLYTE, LITHIUM BATTERY AND LITHIUM METAL BATTERY INCLUDING THE SAME, AND METHOD OF PREPARING THE ELECTROLYTE

CROSS-REFERENCE TO RELATED APPLICATION

This application claims priority to and the benefit of Korean Patent Application No. 10-2014-0088458, filed on Jul. 14, 2014, in the Korean Intellectual Property Office, the disclosure of which is incorporated herein in its entirety by reference.

BACKGROUND

1. Field

The present disclosure relates to electrolytes, lithium batteries, and lithium metal batteries including the same, and methods of preparing the electrolytes.

2. Description of the Related Art

Lithium batteries can be used in a wide variety of applications due to their high voltage and high energy density. For example, lithium batteries may be applied to electric vehicles such as hybrid electric vehicles (HEVs) and plug-in hybrid electric vehicles (PHEVs). Lithium batteries need to operate at high temperatures, have high charge and discharge capacities, and have long lifespans to be used in electric vehicles.

Particularly, significant research efforts into lithium batteries including a polymer electrolyte have been conducted due to their high energy density and high discharge voltage. Polyethylene oxide (PEO) is most often used as the polymer electrolyte.

However, although the polymer electrolyte including PEO has a relatively high ion conductivity of $10^{-4}$ S/cm at a high temperature of 60° C. or greater, the ion conductivity may be decreased to $10^{-6}$ S/cm at room temperature.

Therefore, there is a need to develop an electrolyte having high ion conductivity and excellent mechanical properties at a relatively low temperature or at room temperature and having high electrochemical stability and excellent lifespan characteristics and a lithium battery including the electrolyte.

SUMMARY

Provided are electrolytes having high ion conductivity and excellent mechanical properties at room temperature.

Provided are lithium batteries having high electrochemical stability and excellent lifespan characteristics by using the electrolytes.

Provided are lithium metal batteries having high electrochemical stability and excellent lifespan characteristics by using the electrolytes.

Provided are methods of preparing electrolytes having high ion conductivity and excellent mechanical properties at room temperature.

Additional aspects will be set forth in part in the description which follows and, in part, will be apparent from the description, or may be learned by practice of the presented embodiments.

According to an aspect, an electrolyte includes:
a block copolymer having a first domain and a second domain covalently linked to the first domain;
an ionic liquid;
an oligomer;
an inorganic particle; and
a lithium salt,
wherein the first domain includes an ion conductive polymer block, and the second domain includes a non-conducting polymer block.

According to another aspect, a lithium battery includes:
a positive electrode including a positive active material;
a negative electrode including a negative active material; and
an electrolyte interposed between the positive electrode and the negative electrode,
wherein the electrolyte includes the aforementioned electrolyte.

According to another aspect, a lithium metal battery includes:
a positive electrode including a positive active material;
a negative electrode including a lithium metal or lithium alloy as a negative active material, and
a separator interposed between the positive electrode and the negative electrode,
wherein the separator includes the aforementioned electrolyte.

According to another aspect, a method of preparing an electrolyte includes:
preparing a first solution by contacting a block copolymer having a first domain and a second domain covalently linked to the first domain with a solvent;
preparing a second solution by contacting the first solution with a lithium salt; and
preparing an electrolyte by contacting an ionic liquid, an oligomer, and an inorganic particle with the second solution to prepare a composition, and removing the solvent from the composition.

BRIEF DESCRIPTION OF THE DRAWINGS

These and/or other aspects will become apparent and more readily appreciated from the following description of the embodiments, taken in conjunction with the accompanying drawings in which.

Figure 6:
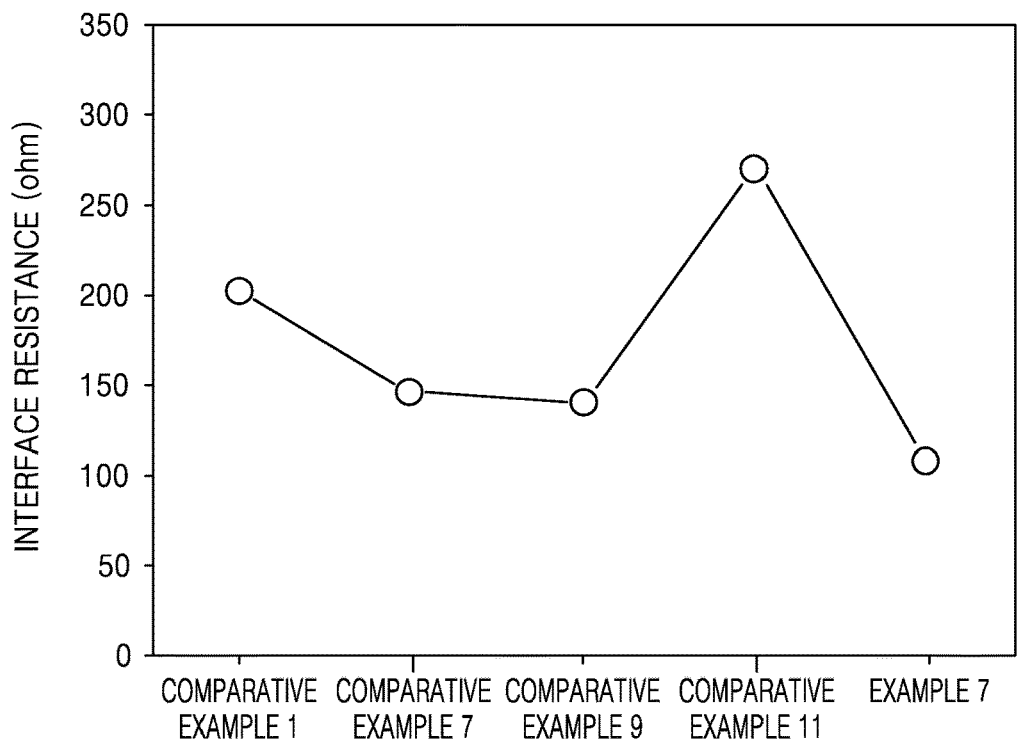
Figure 7:
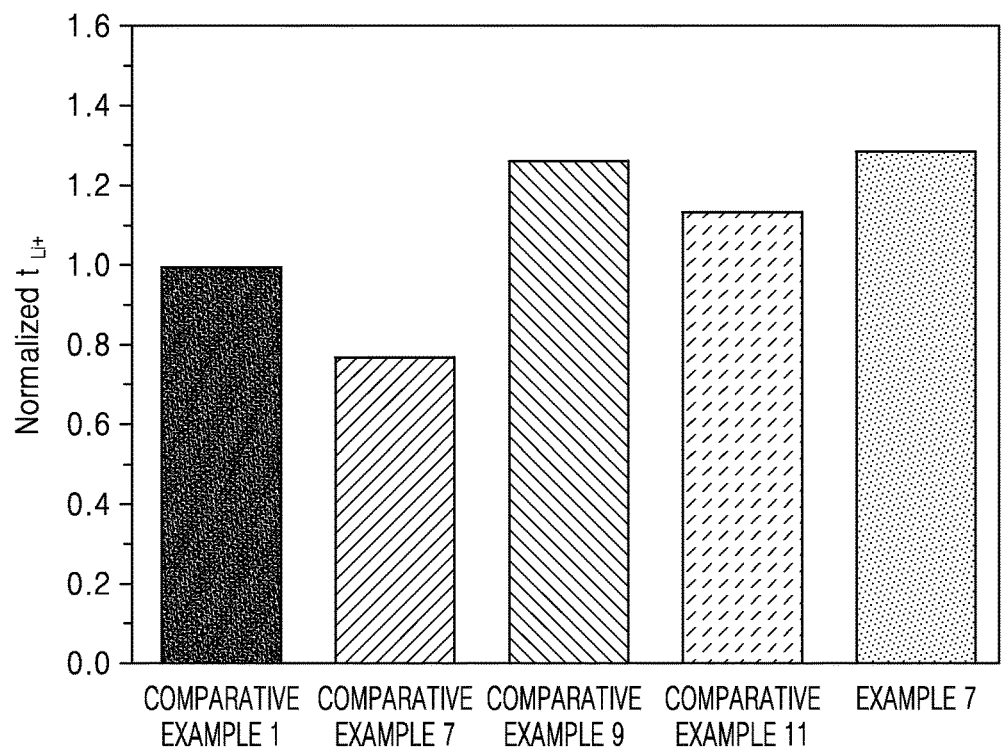
Figure 8:
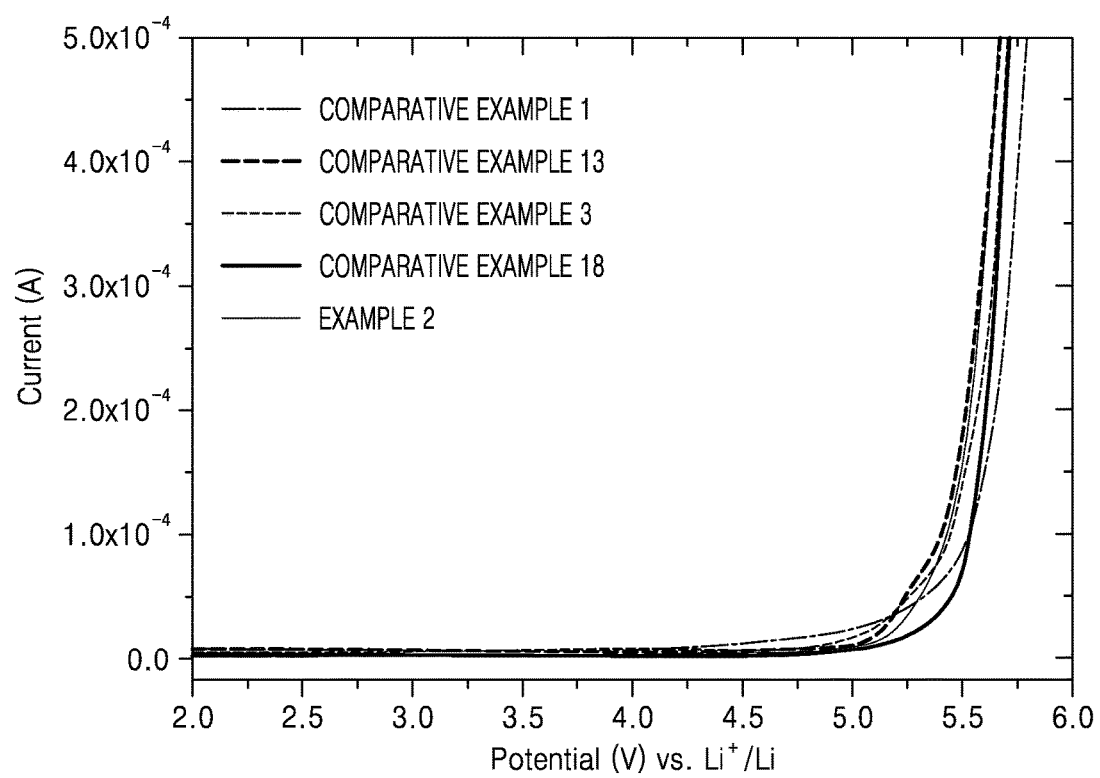
Figure 9A:
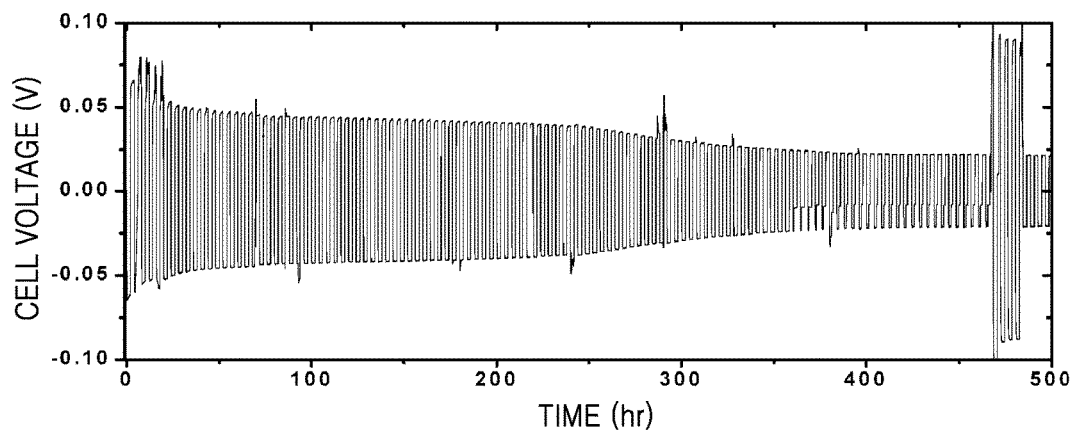
Figure 9B:
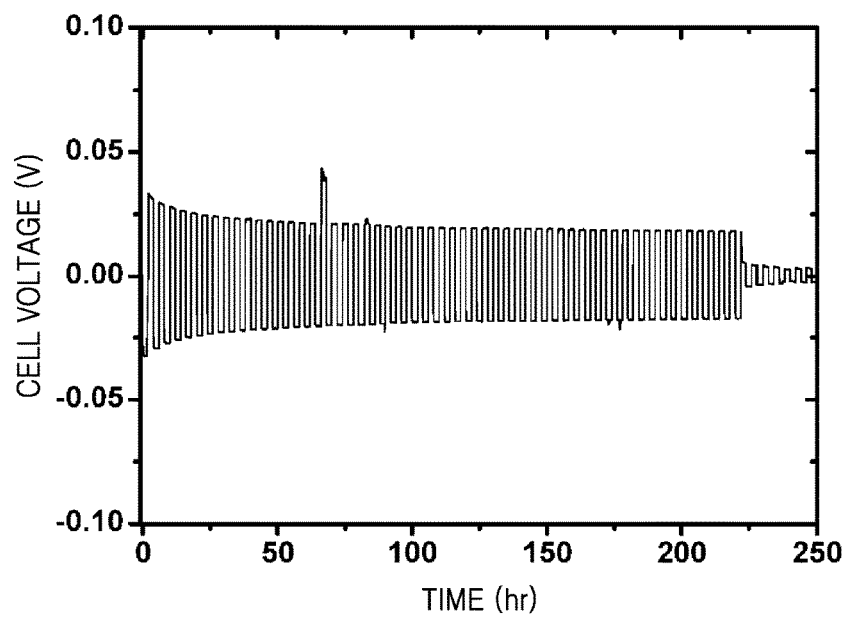

[Li]) molar ratio illustrating ion conductivity of electrolytes according to Example 7, Comparative Examples 6 and 17 measured by using a function of an ionic liquid/lithium ion (IL/Li) molar ratio at 25° C.;

FIG. 6 is a diagram illustrating interface resistance (Ohms, Ω) of electrolytes according to Example 7, Comparative Examples 1, 7, 9, and 11 measured by impedance spectroscopy at 60° C.;

FIG. 7 is a graph illustrating normalized lithium ion mobility of electrolytes according to Example 7, Comparative Examples 1, 7, 9, and 11 measured by impedance spectroscopy at 60° C.;

FIG. 8 is a graph of current (Amperes, A) versus potential (Volts, V) vs. $Li^+/Li$ illustrating electrochemical stability of lithium batteries respectively including electrolytes according to Example 2, Comparative Examples 1, 3, 13, and 18 measured by linear sweep voltammetry (LSV) at 60° C.;

FIG. 9A is a graph of cell voltage (Volts, V) versus time (hours, hr) illustrating cycle characteristics of a lithium battery including an electrolyte according to Example 1 measured at 0.01 milli Amperes (mA) at 60° C.; and FIG. 9B is a graph of cell voltage (Volts, V) versus time (hours, hr) illustrating cycle characteristics of a lithium battery including an electrolyte according to Comparative Example 1 measured at 0.01 milli Amperes (mA) at 60° C.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrolyte, a lithium battery and a lithium metal battery including the electrolyte, and a method of preparing the electrolyte according to embodiments will be described in detail.

According to an embodiment, an electrolyte includes:
a block copolymer, which has a first domain and a second domain adjacent to and covalently linked with the first domain,
an ionic liquid,
an oligomer,
an inorganic particle, and
a lithium salt.

The first domain includes an ion conductive polymer block, and the second domain includes a non-conducting polymer block.

Since the electrolyte includes the ionic liquid, the oligomer, the inorganic particle, and the lithium salt in addition to the block copolymer including an ion flow region and a rigid region providing excellent mechanical strength, ion conductivity, lithium ion mobility, and mechanical properties may be improved. Accordingly, a lithium battery including the electrolyte may be electrochemically stable and may have improved lifespan characteristics.

Figure 1:
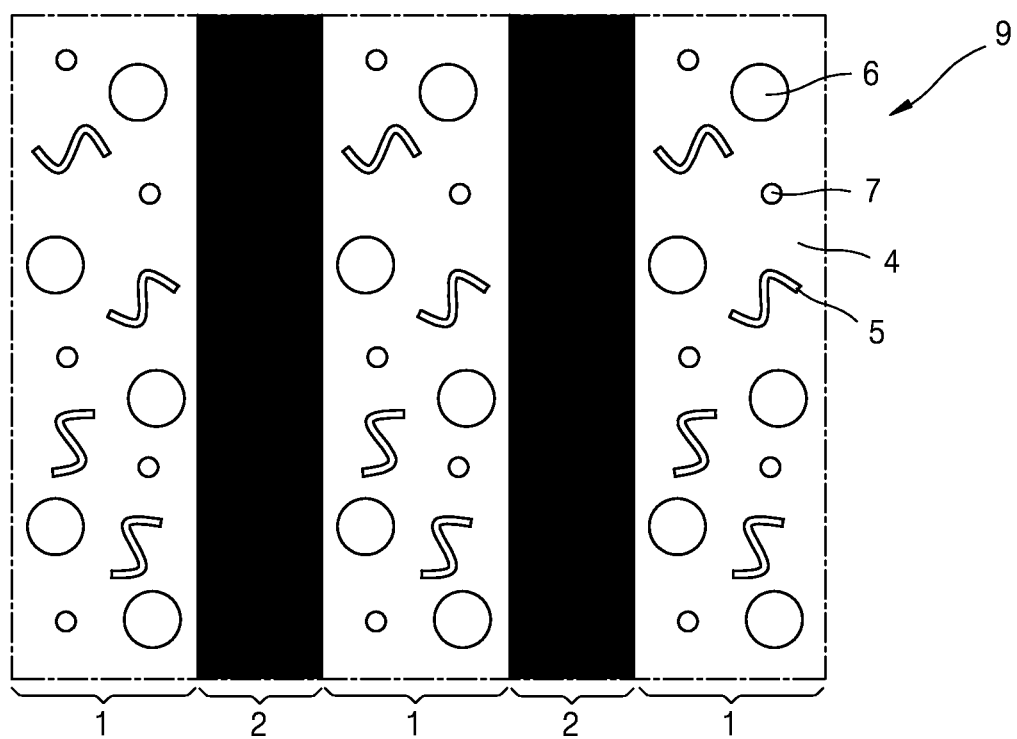
FIG. 1 is a schematic diagram of an electrolyte according to an embodiment.

FIG. 1 is a schematic diagram of an electrolyte 9 according to an embodiment.

As illustrated in FIG. 1, an ionic liquid 4, an oligomer 5, an inorganic particle 6, and a lithium salt 7 are introduced into only a first domain 1 of the electrolyte 9.

A size $D_1$ of the first domain 1 determined by transmission electron microscopy (TEM), small angle X-ray scattering (SAXS) may be greater than a size $D_2$ of a second domain 2.

In addition, the electrolyte 9 may have the size $D_1$ of the first domain 1 greater than the size of the first domain of an electrolyte including some of the ionic liquid 4, the oligomer 5, the inorganic particle 6, and the lithium salt 7.

The size $D_1$ of the first domain 1 may be in a range of about 22 nanometers (nm) to about 100 nm. For example, the size $D_1$ of the first domain 1 may be in a range of about 23 nm to about 100 nm. For example, the size $D_1$ of the first domain 1 may be in a range of about 24 nm to about 100 nm. For example, the size $D_1$ of the first domain 1 may be in a range of about 25 nm to about 100 nm. The domain size may generally be determined by transmission electron microscopy (TEM), small angle X-ray scattering (SAXS), or the like. The size $D_1$ of the first domain 1 may be obtained using a scattering vector $q_1$ of Bragg peak of the first domain 1 obtained using the SAXS according to Equation 1:

$$D_1 = 2\pi/q_1 \qquad \text{Equation 1}$$

and illustrated in FIGS. 4A and 4B which will be described below.

The size $D_2$ of the second domain 2 may be obtained using a scattering vector $q_2$ of Bragg peak of the second domain 2 obtained using the SAXS according to Equation 2:

$$D_2 = 2\pi/q_2 \qquad \text{Equation 2}$$

A number average molecular weight Mn of the ion conductive polymer block contained in the first domain may be 10,000 Da (Daltons) or greater. For example, the number average molecular weight Mn of the ion conductive polymer block may be in a range of about 10,000 Da to about 500,000 Da. For example, the number average molecular weight Mn of the ion conductive polymer block may be in a range of about 10,000 Da to about 100,000 Da. While not wishing to be bound by a theory, it is understood that when the ion conductive polymer block having the number average molecular weight Mn is within the ranges described above, the polymer chains may have an appropriate length, i.e. degree of polymerization, and the ion conductivity of the electrolyte may be improved.

A number average molecular weight Mn of the non-conducting polymer block contained in the second domain may be 10,000 Da or greater. For example, the number average molecular weight Mn of the non-conducting polymer block may be in a range of about 10,000 Da to about 500,000 Da. For example, the number average molecular weight Mn of the non-conducting polymer block may be in a range of about 10,000 Da to about 400,000 Da. While not wishing to be bound by a theory, it is understood that when the non-conducting polymer block having the number average molecular weight Mn is within the ranges described above, the polymer chains may have an appropriate length, i.e. degree of polymerization, and the mechanical properties of the electrolyte may be improved.

A content of the non-conducting polymer block contained in the second domain may be in a range of about 20 percent (%) by weight to about 45% by weight based on a total weight of the block copolymer. For example, the content of the non-conducting polymer block may be in a range of about 22% by weight to about 43% by weight based on the total weight of the block copolymer. For example, the content of the non-conducting polymer block may be in the range of about 25% by weight to about 40% by weight based on the total weight of the block copolymer. While not wishing to be bound by a theory, it is understood that when the non-conducting polymer block has the content within the ranges described above, the electrolyte may have excellent mechanical properties and ion conductivity of the electrolyte sufficient for optimal cell performance.

The block copolymer may include a linear block copolymer, a branched block copolymer, or a combination thereof. In addition, the block copolymer may have any shape. For example, a lamellar, cylindrical, spherical, ellipsoidal, polyhedral, or gyroid shape, or the like. In an embodiment, the block copolymer may have an irregular shape. The branched block copolymer may be any type of copolymer known to one of ordinary skill in the art. For example, the branched block copolymer can be a stereoblock copolymer, a graft polymer, a star-shaped polymer, a comb polymer, a brush polymer, or a polymer network, without being limited thereto, and any polymer commonly used in the art as the branched block copolymer may also be used.

The block copolymer may include at least one of a linear diblock copolymer A-B and a linear triblock copolymer A-B-A'.

The blocks A and A' may be the same or different and may be ion conductive polymer blocks respectively selected from a polyethylene oxide (PEO) block, a polysiloxane block, a polypropylene oxide (PPO) block, a polyethylene oxide-grafted polymethylmethacrylate (PEO-grafted PMMA) block, a polypropylene oxide-grafted polymethylmethacrylate (PPO-grafted PMMA) block, a poly(dialkylsiloxane-co-ethylene oxide block), a poly(dialkylsiloxane-co-propylene oxide) block, and a polysiloxane-grafted PMMA block. The PEO and PPO pendant chains of the PEO-grafted PMMA block, PPO-grafted PMMA block have increased flexibility compared to the original linear PEO and PPO backbones, which may lead to increased segmental motion and ionic conductivity of the block copolymer. In the poly(dimethyl siloxane-co-ethylene oxide) block and the poly(dialkylsiloxane-co-propylene oxide) block, the siloxane units increase flexibility while the ethylene or propylene oxide units provide coordinating sites for lithium salts.

The block B may be a non-conducting polymer block selected from a polystyrene (PS) block, a PMMA block, a polyvinylpyridine block, a polyimide block, a polyethylene block, a polypropylene block, a polyvinylidene fluoride (PVDF) block, a polyacrylonitrile (PAN) block, and a polydimethylsiloxane (PDMS) block.

For example, the blocks A and A' may be ion conductive polymer blocks selected from PEO, polysiloxane, and PPO, and may be the same or different.

The block B may be a non-conducting polymer block selected from PS and PMMA.

The block copolymer may also include a linear tetrablock copolymer A-B-A'-B'. In this tetrablock copolymer, the blocks A and A' may be the same or different and may be ion conductive polymer blocks and the blocks B and B' may be the same or different and may be non-conducting polymer blocks. Ion conductive blocks A, A' and non-conducting blocks B and B' may be selected from the same polymer blocks as described above with regard to the triblock copolymer A-B-A'.

The ionic liquid may include at least one cation selected from a pyrrolidinium cation, a pyridinium cation, an imidazolium cation, a piperidinium cation, and an ammonium cation, an alkylammonium cation, and an least one anion selected from bis(trifluoromethylsulfonyl)imide, bromide, chloride, dicyanamide, hexafluorophosphate, phosphate, sulfate, iodide, sulfonate, nitrate, tetrafluoroborate, thiocyanate, and triflate. The ionic liquid may include an ion liquid functionalized with an appropriate functional group. The ionic liquid may be added to the block copolymer to further improve ion conductivity, and a lithium battery including the ionic liquid may have increased capacity.

An ionic liquid/lithium ion (IL/Li) molar ratio may be in a range of about 0.1 to about 2.0. For example, the IL/Li molar ratio may be in a range of about 0.2 to about 1.8. For example, the IL/Li molar ratio may be in a range of about 0.4 to about 1.5. While not wishing to be bound by a theory, it is understood that when the ionic liquid is included in the IL/Li molar ratio within the ranges described above, the ionic liquid may improve mobility of ions, i.e., lithium ion mobility, and thereby improve ion conductivity of the electrolyte. In addition, the inclusion of the ionic liquid having the IL/Li molar ratio within the ranges described above may further improve mechanical properties of the electrolyte and may inhibit or prevent the growth of lithium dendrite on a surface of a negative electrode.

The oligomer may include an ethylene oxide repeating unit or an ethylene glycol repeating unit and may be a linear oligomer in which the repeating units are aligned in one chain. The oligomer may also be a branched oligomer, having three to ten chains emanating from a central core group, a star oligomer having 10 to 100 chains emanating from a central core group, and a comb oligomer having multiple chains normally grafted onto a polymer backbone. The oligomer may have a number average molecular weight Mn of about 200 Da to about 2,000 Da. The oligomer may, for example, include at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA), but is not limited thereto.

A content of the oligomer may be in a range of about 5% by weight to about 50% by weight based on a total weight of an electrolyte. For example, the content of the oligomer may be in a range of about 10% by weight to about 40% by weight based on the total weight of the electrolyte. For example, the content of the oligomer may be in a range of about 15% by weight to about 30% by weight based on the total weight of the electrolyte. While wishing not to be bound by a theory, it is understood that when the content of the oligomer is within the ranges described above, the electrolyte may have improved lithium ion mobility.

The inorganic particle may be dispersed in the first domain and may include a nanoparticle of at least one selected from $SiO_2$, $TiO_2$, ZnO, $Al_2O_3$, $BaTiO_3$, and a metal-organic framework (MOF).

The nanoparticle may have an average particle diameter of about 5 nm to about 100 nm, for example, about 5 nm to about 90 nm. The inorganic particle may also include an inorganic particle functionalized with a desired functional group. The presence of the inorganic particle may improve mechanical properties of the electrolyte.

The MOF may be a crystalline compound, such as, a porous crystalline compound. The MOF may be formed via a chemical bond between a metal ion or metal ion cluster and an organic ligand.

The metal ion constituting the MOF may be any metal ion efficiently forming a coordinate covalent bond or covalent bond. For example, the metal ion may include at least one selected from $Zn^{2+}$, $Ti^{4+}$, $Fe^{2+}$, $Fe^{3+}$, $V^{4+}$, $V^{3+}$, $V^{2+}$, $Zr^{4+}$, $Cu^{1+}$, $Cu^{2+}$, and $Cu^{3+}$ or an oxo-centered metal cluster ion including the metal ion. The organic ligand may be any organic material having a group capable of forming a coordinate covalent bond, ionic bond, or covalent bond such as carboxylic acid or a compound including a heterocyclic moiety, such as imidazole, oxazole, triazole, oxadiazole, or any organic material, which may also provide at least two sites for a coordinate covalent bond, ionic bond, or covalent bond to form a stable MOF, i.e., a bidentate or tridentate ligand. For example, the organic ligand may include at least one selected from an aromatic dicarboxylic acid, an aromatic tricarboxylic acid, an imidazole compound, an oxazole compound, a triazole compound, an oxadiazole compound, and any combination thereof. Examples of the aromatic dicarboxylic acid or aromatic tricarboxylic acid may include benzene dicarboxylic acid, benzene tricarboxylic acid, naphthalene dicarboxylic acid, biphenyl dicarboxylic acid, or triphenyl dicarboxylic acid. A content of the organic ligand may be equal to or greater than 1 mole (mol) based on 1 mol of the metal ion.

A content of the inorganic particle may be in a range of about 1% by weight to about 40% by weight based on the total weight of the electrolyte. For example, the content of the inorganic particle may be in a range of about 2% by weight to about 20% by weight based on the total weight of the electrolyte. For example, the content of the inorganic particle may be in a range of about 5% by weight to about 12% by weight based on the total weight of the electrolyte. While not wishing to be bound by a theory, it is understood that when the content of the inorganic particle is within the ranges described above, the electrolyte may have improved ion conductivity and mechanical properties sufficient for optimal battery performance, and the inorganic particle may be uniformly dispersed in the electrolyte.

The lithium salt may include at least one selected from lithium trifluoromethanesulfonimide (LiTFSI), $LiBF_4$, $LiPF_6$, lithium bis[1,2-oxalato 2+O,O]borate (LiBOB), and $LiClO_4$. However, the lithium salt is not limited thereto, and any lithium salt commonly used in the art may also be used. A content of the lithium salt may be in a range of about 0.01 mol to about 3 mol based on 1 mol of the electrolyte. While not wishing to be bound by a theory, it is understood that when the content of the lithium salt is within the ranges described above, efficient migration of the lithium ions may be enabled, and the electrolyte including the lithium salt may have suitable ion conductivity and viscosity.

The electrolyte may further include an organic solvent or a homopolymer. The organic solvent or homopolymer may serve as an additive.

For example, the organic solvent may include at least one selected from an ether solvent, such as diethyl ether or tetrahydrofuran, an ester solvent, such as ethyl acetate, a carbonate solvent, such as ethylene carbonate, propylene carbonate, dimethyl carbonate, fluoroethylene carbonate (FEC), a nitrile solvent, such as acetonitrile, an aprotic dipolar solvent, such dimethyl sulfoxide (DMSO), dimethyl formamide (DMF), or N-methyl-2-pyrrolidone (NMP), and a ketone solvent, such as 2,2-dimethoxy-2-phenylacetophenone (DMP). The organic solvent may further improve the ion conductivity of the electrolyte. However, the organic solvent is not limited thereto, and any organic solvent or solvent combination commonly used in the art may also be used.

A content of the organic solvent may be in a range of about 1% by weight to about 20% by weight, for example, about 2% by weight to about 20% by weight, and for example, about 5% by weight to about 20% by weight, based on the total weight of the electrolyte. While not wishing to be bound by a theory, it is understood that when the content of the organic solvent is within the ranges described above, ion conductivity and mechanical properties of the electrolyte sufficient for optimal battery performance may be obtained.

The electrolyte may further include a homopolymer. For example, the homopolymer may include at least one selected from polystyrene (PS), polymethylmethacrylate (PMMA), polyethylene oxide (PEO), polyvinyl alcohol (PVA), and polyacrylonitrile (PAN). A number average molecular weight Mn of the homopolymer may be equal to or greater than 5,000 Da. The homopolymer may further improve ion conductivity and/or mechanical properties of the electrolyte.

A content of the homopolymer may be in a range of about 5% by weight to about 30% by weight, for example, about 5% by weight to about 20% by weight, and for example, about 5% by weight to about 15% by weight, based on the total weight of the electrolyte. While not wishing to be bound by a theory, it is understood that when the content of the homopolymer is within the ranges described above, ion conductivity and mechanical properties of the electrolyte sufficient for optimal battery performance may be obtained.

The electrolyte may include a gel phase or solid phase layer. For example, the electrolyte may include a sheet-shaped layer or a film-shaped layer. A thickness of the layer may be equal to or less than 100 μm. For example, the thickness of the layer may be equal to or less than 80 μm. For example, the thickness of the layer may be equal to or less than 60 μm.

The electrolyte may have an ion conductivity of $1 \times 10^{-4}$ Siemens per centimeter (S/cm) or greater at 25° C. The electrolyte may have a Young's modulus of 1.0 mega Pascal (MPa) or greater. The electrolyte may have ion conductivity and mechanical properties sufficient for optimal battery performance at room temperature.

According to another embodiment, a lithium battery includes:
 a positive electrode including a positive active material,
 a negative electrode including a negative active material, and
 an electrolyte interposed between the positive electrode and the negative electrode.

In this regard, the electrolyte is as it is described above.

Types of phase of the electrolyte and thickness of the electrolyte are as described above.

The layer may have a single layer or multiple layers.

The lithium battery may further include a protective layer partially formed on and in contact with a surface of the negative electrode. Alternatively, the protecting layer may be separately formed as a single layer or multiple layers, and therefore, may have no direct contact with the negative electrode.

The protective layer may include a block copolymer and a lithium salt. The block copolymer may include a first domain and a second domain adjacent to and covalently linked with the first domain. The first domain may include an ion conductive polymer block, and the second domain may include a non-conducting polymer block. The protective layer may inhibit or prevent growth of a dendrite on the surface of the negative electrode. Accordingly, the lithium battery may have excellent mechanical properties and high lithium ion mobility.

The protective layer may be a gel phase layer or a solid phase layer. The protective layer may have a thickness equal to or less than 100 micrometers (μm), for example, equal to or less than 50 μm, for example, equal to or less than 10 μm, and for example, equal to or less than 2 μm.

The lithium battery may have an operation voltage of 4.5 Volts (V)±0.5 V. For example, the lithium battery may have an operation voltage of about 4.5 V to about 5.0 V.

The lithium battery may be prepared in the following manner.

First, the positive electrode may be prepared as follows.

A positive active material, a conductive material, a binder, and a solvent are mixed to prepare a positive active material composition. The positive active material composition may be directly coated on a current collector and dried to provide a positive electrode having the positive active material layer. Alternatively, the positive active material composition may be cast on a separate support. Then, a film separated from the support is laminated on the current collector to prepare a positive electrode having the positive active material layer.

The positive active material may be any material allowing intercalation and deintercalation of lithium ions commonly used in the art in positive electrodes. Examples of the positive active material allowing intercalation and deintercalation of lithium ions may include a compound represented by one of the following Formulae: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-b}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-b}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-b}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-b}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-b}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-b}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_bG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_bMn_cG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $LiQO_2$; $LiQS_2$; $LiV_2O_5$; $LiNiVO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$, without being limited thereto.

In the formulae above, A is selected from nickel (Ni), cobalt (Co), manganese (Mn), and combinations thereof; B' is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

Examples of the conductive material include a carbonaceous material such as carbon black, graphite, natural graphite particulates, artificial graphite, acetylene black, ketjen black, carbon fiber, and carbon nanotube; a metal such as copper, nickel, aluminum, and silver, each of which may be used in powder, fiber, or tube form; and conductive polymers such as polyphenylene derivatives, without being limited thereto. Any other materials commonly used in the art as the conductive material may also be used.

Examples of the binder include a vinylidene fluoride/hexafluoropropylene copolymer, polyvinylidene difluoride (PVDF), polyacrylonitrile, polymethylmethacrylate, polytetrafluoroethylene (PTFE), a combination thereof, and a styrene butadiene rubber polymer.

In addition, examples of the binder include: polysaccharides and derivatives thereof such as starch, methylcellulose, carboxymethylcellulose, hydroxymethylcellulose, hydroxyethylcellulose, hydroxypropylcellulose, carboxymethylhydroxyethylcellulose, and nitrocellulose; a phenol polymer; a melamine polymer; a polyurethane; a urea polymer; a polyamide; a polyimide; a polyamideimide; a petroleum pitch; and a coal pitch. A plurality of binders may be used. The binder may be used as a thickener in an electrode mixture.

Examples of the solvent include N-methylpyrrolidone (NMP), acetone, and water, without being limited thereto. Any solvent or solvent combination commonly used in the art may also be used.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it is easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The he positive active material, the conductive material, the binder, and the solvent may be utilized in amounts commonly used in the art in the manufacture of the lithium battery. At least one of the conductive material, the binder, and the solvent may not be used according to the use and the structure of the lithium battery. If desired, a plasticizer may further be added to the positive active material composition to form pores inside an electrode.

The negative electrode may be prepared in the same manner as in the preparation of the positive electrode, except that the negative active material is used instead of the positive active material.

For example, the negative electrode may be prepared in the following manner.

Similar to the preparation of the positive electrode, the negative electrode may be prepared by mixing a negative active material, a conductive material, a binder, and a solvent to prepare a negative active material composition and by directly coating the composition on a current collector. Alternatively, the negative electrode may be prepared by casting the negative active material composition on a separate support, and by subsequently laminating a negative active material film separated from the support on the current collector.

The negative active material may include lithium metal, a metal that is capable of forming an alloy with lithium, a transition metal oxide, a material that allows doping or undoping of lithium, and a material that allows reversible intercalation and deintercalation of lithium ions.

Examples of the transition metal oxide include vanadium oxide and lithium vanadium oxide. Examples of the material that allows doping or undoping of lithium include, Si, $SiO_x$ (wherein $0<x\leq2$), an Si—Y alloy, wherein Y is an alkali metal, an alkali earth metal, Group XIII elements to Group XVI elements, a transition metal, a rare earth element, or any combination thereof (except for Si), Sn, $SnO_2$, an Sn—Y alloy, wherein Y is an alkali metal, an alkali earth metal, Group XIII elements to Group XVI elements, a transition metal, a rare earth element, or any combination thereof (except for Sn), wherein at least one of these materials may be used in combination with $SiO_2$. In this regard, Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

The material that allows reversible intercalation and deintercalation of lithium ions may be any carbonaceous material that is a carbonaceous negative active material commonly used in lithium-ion secondary batteries. Examples of the carbonaceous material may include crystalline carbon, amorphous carbon, or combinations thereof. Examples of the crystalline carbon include natural graphite or artificial graphite that may be in amorphous, plate, flake, spherical or fibrous form. Examples of the amorphous carbon include soft carbon (carbon sintered at low temperatures), hard carbon, meso-phase pitch carbides, sintered coke, and the like.

However, the negative active material is not limited thereto, and any material that allows intercalation and deintercalation of lithium and commonly used as a negative active material may also be used.

Any current collector may be used as the negative current collector without being limited by a material type, shape, and manufacturing method thereof. For example, a copper foil having a thickness of about 10 to about 100 micrometers (μm), a perforated copper foil having a pore diameter of about 0.1 to about 10 millimeters (mm) and a thickness of about 10 to about 100 μm, an expanded metal, or a foamed metal plate may be used. In addition to copper, stainless steel, titanium, and nickel may also be used as a material to form the negative current collector.

The conductive material, the binder, and the solvent used in the negative active material composition may be the same as those used in the positive active material composition. If desired, a plasticizer may further be added to the positive active material composition and the negative active material composition to form pores inside the electrode plates.

The negative active material, the conductive material, the binder, and the solvent may be utilized in amounts commonly used in the art in the manufacture of the lithium battery. At least one of the conductive material, the binder, and the solvent may not be used according to the use and the structure of the lithium battery.

Next, a separator to be interposed between the positive electrode and the negative electrode is prepared. The separator may be any separator commonly used in lithium batteries. Any separator having low resistance against migration of ions in the electrolyte and excellent electrolyte-retaining ability may be used. Examples of the separator may include glass fiber, polyester, Teflon, polyethylene, polypropylene, polytetrafluoroethylene (PTFE), and any combination thereof, each of which may be a non-woven or woven fabric form. For example, a windable separator including polyethylene or polypropylene may be used in a lithium-ion battery. A separator with excellent organic electrolyte retaining capability may be used in a lithium-ion polymer battery.

The separator may be a separator on which the aforementioned electrolyte including an organic electrolytic solution, which will be described later, is supported.

For example, the separator may be manufactured in the following manner.

A polymer resin, a filler, and a solvent are mixed to prepare a separator composition. Then, the separator composition may be directly coated on an electrode, and dried to form a separator. Alternatively, the separator composition may be cast on a support and then dried to form a separator film. The separator film may subsequently be separated from the support and laminated on an electrode to form the separator.

The polymer resin used to manufacture the separator is not particularly limited and may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate, and any mixture thereof.

Then, an electrolyte is prepared.

The electrolyte may be an electrolyte as described above. The electrolyte may include a gel phase electrolyte layer or a solid phase electrolyte layer. The electrolyte may also include a sheet-shaped electrolyte or a film-shaped electrolyte. The electrolyte may be formed on the negative electrode by sputtering, and the similar process.

In addition, the electrolyte may be an organic electrolytic solution.

The organic electrolytic solution may be prepared by dissolving the lithium salt in an organic solvent.

The organic solvent may be any organic solvent commonly used in the art. Examples of the organic solvent include a carbonate solvent, such as propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate or dibutyl carbonate, a nitrile solvent, such as benzonitrile or acetonitrile, a cyclic ether solvent, such as tetrahydrofuran, 2-methyltetrahydrofuran, or 1,4-dioxane, an ester solvent, such as ethyl acetate or butyl acetate, a lactone solvent, such as γ-butyrolactone, an acetate solvent, such as dioxolane or 4-methyldioxolane, an aprotic dipolar solvent, such as N,N-dimethyl formamide (DMF), dimethyl acetamide (DMA), dimethylsulfoxide (DMSO), an acyclic ether solvent, such as 1,2-dimethoxyethane, a sulfone solvent, such as sulfolane, a chlorinated hydrocarbon solvent, such as dichloroethane or chlorobenzene, a nitro compound, such as nitromethane or nitrobenzene, an alcohol, such as methanol, ethanol, or diethylene glycol, and any combinations thereof.

Figure 2:
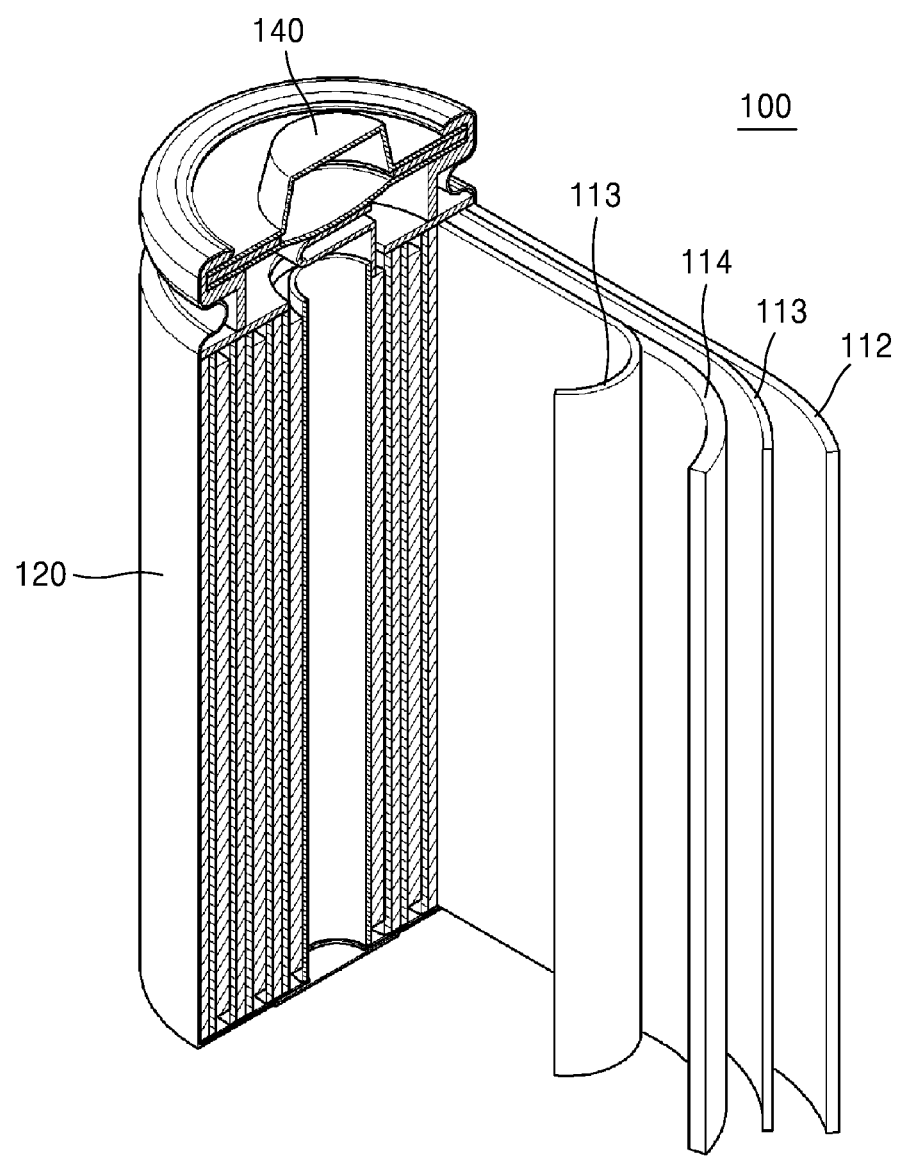
FIG. 2 is an exploded perspective view of a lithium-ion battery according to an embodiment.

FIG. 2 is an exploded perspective view of a lithium-ion battery 100 according to an embodiment.

Referring to FIG. 2, the lithium battery, particularly, the lithium-ion battery 100, includes a positive electrode 114, a separator 113, and a negative electrode 112. The positive electrode 114, the separator 113, and the negative electrode 112 are wound or folded, and then accommodated in a battery case 120. Then, an organic electrolytic solution is injected into the battery case 120, and the battery case 120 is sealed by a sealing member 140, thereby completing the manufacture of the lithium battery 100. The battery case 120 may be a cylindrical type, a rectangular type, or a thin-film type. For example, the lithium battery may be a large thin-film type battery.

The separator may be interposed between the negative and the positive electrodes to form a battery assembly. When the battery assembly is stacked in a bi-cell structure and impregnated with the organic electrolytic solution, and the resultant is put into a pouch and sealed, preparation of a lithium-ion polymer battery is completed. A plurality of battery assemblies may be stacked to form a battery pack, which may be used in any device that requires high capacity and high output, for example, in laptop computers, smart phones, and electric vehicles.

According to another embodiment, a lithium metal battery includes:

a positive electrode including a positive active material;

a negative electrode including a lithium metal or lithium alloy negative electrode; and a separator interposed between the positive electrode and the negative electrode The separator includes the electrolyte described above.

Since the positive active material and positive electrode are the same as those of the lithium-ion battery as described above, detailed descriptions thereof will not be repeated herein.

The lithium alloy negative electrode may be an alloy of lithium and at least one metal selected from Na, K, Rb, Cs, Fr, Be, Mg, Ca, Sr, Ba, Ra, Al, and Sn. The lithium metal or lithium alloy negative electrode may have a thickness of about 50 nm to about 100 μm, for example, about 100 nm to about 1 μm, and for example, about 200 nm to about 500 nm. If desired, the thickness of the negative electrode may be less than 500 nm, for example, less than 200 nm, for example, less than 100 nm, and for example, less than 50 nm.

The electrolyte may be disposed on one surface of the separator facing the positive electrode or the other surface of the separator facing the negative electrode.

The electrolyte may further include an organic electrolytic solution. The separator may include a polymer, such as polypropylene (PP), polyethylene (PE), or a copolymer, such as polypropylene/polyethylene/polypropylene (PP/PE/PP).

The lithium metal battery may further include a protective layer at least partially disposed on and in direct contact with one surface of the negative electrode or disposed separately as a single layer or multiple layers without contacting the negative electrode directly.

The protective layer may include a block copolymer and a lithium salt. The block copolymer may include a first domain and a second domain adjacent to and covalently linked with the first domain. The first domain may include an ion conductive polymer block, and the second domain may include a non-conducting polymer block. The protective layer may inhibit or prevent a dendrite from growing on the surface of the negative electrode. Accordingly, the lithium metal battery may have excellent mechanical properties and high lithium ion mobility.

The protective layer may be a gel phase layer or a solid phase layer. A thickness of the protective layer may be equal to or less than 100 μm. For example, the thickness of the layer may be equal to or less than 50 μm. For example, the thickness of the protective layer may be equal to or less than 10 μm. For example, the thickness of the protective layer may be equal to or less than 2 μm.

Figure 3:
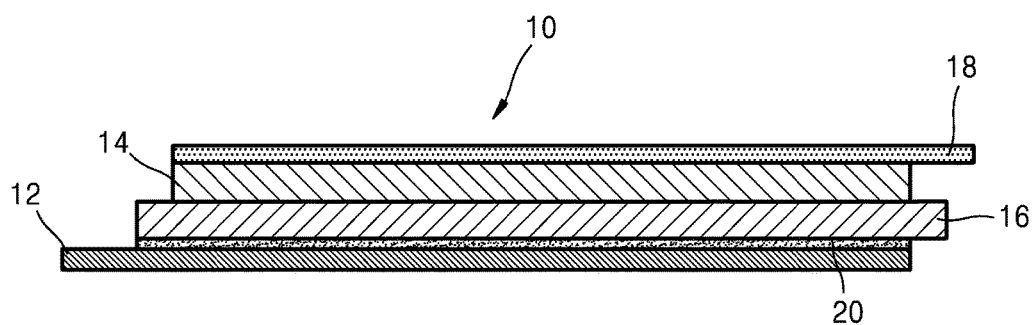
FIG. 3 is a schematic diagram of a lithium metal battery according to an embodiment.

FIG. 3 is a schematic diagram of a lithium metal battery 10 according to an embodiment.

Referring to FIG. 3, in the lithium metal battery 10, a separator 16 including an electrolyte is disposed between a lithium metal negative electrode 12 and a positive electrode including a positive current collector 18 and a positive active material 14, and a protective layer 20 is disposed on one surface of the lithium metal negative electrode 12.

A thickness of the protective layer 20 may be in a range of about 500 nm to about 2 μm, for example, about 1,000 nm to about 1 μm. While not wishing to be bound by a theory, it is understood that when the lithium metal battery including the protective layer has a thickness within the ranges described above, the lithium metal battery may have sufficient ion conductivity and mechanical properties for optimal performance.

Meanwhile, the lithium metal batteries may be stacked in a bi-cell structure to form a battery assembly. A plurality of battery assemblies may be stacked to form a battery pack, which may be used in any device that requires high capacity and high output, for example, in laptop computers, smart phones, and electric vehicles.

Lithium batteries including lithium-ion batteries or lithium metal batteries may also be suitable for use as power sources for electric vehicles (EVs) due to excellent storage stability at high temperature, excellent lifespan characteristics, and high rate capability. For example, lithium batteries may be applied to hybrid electric vehicles such as plug-in hybrid electric vehicles (PHEVs).

According to another embodiment, a method of preparing an electrolyte includes:

preparing a first solution by contacting a block copolymer having a first domain and a second domain adjacent to and covalently linked with the first domain with a solvent;

preparing a second solution by contacting the first solution with a lithium salt; and preparing the electrolyte by contacting an ionic liquid, an oligomer, and a plurality of inorganic particles with the second solution to prepare a composition, and removing the solvent from the composition.

According to the preparation method, an electrolyte in a homogeneous layer may be prepared.

The method of preparing the electrolyte may further include sonicating the composition before removing the solvent from the composition to preparing the electrolyte. The sonication process may be used to uniformly disperse the plurality of inorganic particles in the mixture.

Since the types of the first domain, the types and contents of the second domain, the types of the block copolymer, the lithium salt and the content thereof, the ionic liquid and the content thereof, the oligomer and the content thereof, and the inorganic particle and the content thereof are described above, detailed descriptions thereof will not be repeated herein. The solvent may be any organic solvent described above, such as tetrahydrofuran or acetonitrile.

Hereinafter, one or more embodiments will be described in detail with reference to the following examples. However, these examples are not intended to limit the purpose and scope of the one or more embodiments.

In addition, those embodiments not described herein would have been apparent to one of ordinary skill in the art, and thus detailed descriptions thereof will not be given herein.

EXAMPLES

Preparation of Electrolyte

Example 1: Preparation of Electrolyte

A polystyrene-b-poly(ethyleneoxide)-b-polystyrene (PS-b-PEO-b-PS) block copolymer (10-36-10 kilograms per mole (kg/mol), Polymer Source, Inc., number average molecular weight Mn=56,000 Daltons (Da)) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide ($PYR_{14}TFSI$, ≥98% HPLC grade, number average molecular weight Mn=422.41 Da, C-TRI), 10% by weight of poly(ethylene glycol) dimethyl ether (PEGDME, ≥99% HPLC grade, number average molecular weight Mn=250 Da, Sigma Aldrich Corporation), and 5% by weight of $SiO_2$ having an average particle diameter of 7 nanometers (nm) were added to the second solution to prepare a mixture. The ionic liquid/lithium ion (IL/Li) molar ratio was 0.1.

The mixture was stirred at room temperature for 24 hours and sonicated to uniformly disperse $SiO_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 2: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide ($PYR_{14}TFSI$, ≥98% HPLC grade, number average molecular weight Mn=422.41 Da, C-TRI), 18% by weight of poly(ethylene glycol) dimethyl ether (PEGDME, ≥99% HPLC grade, number average molecular weight Mn=250 Da, Sigma Aldrich Corporation), and 5% by weight of $SiO_2$ having an average particle diameter of 7 nm were added to the second solution to prepare a mixture. The ionic liquid/lithium ion (IL/Li) molar ratio was 0.2.

The mixture was stirred at room temperature for 24 hours and sonicated to uniformly disperse $SiO_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 3: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=442.41 Da, C-TRI), 30% by weight of poly(ethylene glycol) dimethyl ether (PEGDME, ≥99% HPLC grade, number average molecular weight Mn=250 Da, Sigma Aldrich Corporation), and 10% by weight of SiO$_2$ having an average particle diameter of 7 nm were added to the second solution to prepare a mixture. The ionic liquid/lithium ion (IL/Li) molar ratio was 0.5.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 4: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=442.41 Da, C-TRI), 18% by weight of poly(ethylene glycol) dimethyl ether (PEGDME, ≥99% HPLC grade, number average molecular weight Mn=250 Da, Sigma Aldrich Corporation), and 5% by weight of SiO$_2$ having an average particle diameter of 7 nm were added to the second solution to prepare a mixture. The ionic liquid/lithium ion (IL/Li) molar ratio was 0.8.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 5: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution such that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), 18% by weight of poly(ethylene glycol) dimethyl ether (PEGDME, ≥99% HPLC grade, number average molecular weight Mn=250 Da, Sigma Aldrich Corporation), and 5% by weight of SiO$_2$ having an average particle diameter of 7 nm were added to the second solution to prepare a mixture. The ionic liquid/lithium ion (IL/Li) molar ratio was 1.0.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 6: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), 30% by weight of poly(ethylene glycol) dimethyl ether (PEGDME, ≥99% HPLC grade, number average molecular weight Mn=250 Da, Sigma Aldrich Corporation), and 10% by weight of SiO$_2$ having an average particle diameter of 7 nm were added to the second solution to prepare a mixture. In this regard, the ionic liquid/lithium ion (IL/Li) molar ratio was 1.0.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Example 7: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), 18% by weight of poly(ethylene glycol) dimethyl ether (PEGDME, ≥99% HPLC grade, number average molecular weight Mn=250 Da, Sigma Aldrich Corporation), and 5% by weight of SiO$_2$ having an average particle diameter of 7 nm were added to the second solution to prepare a mixture. The ionic liquid/lithium ion (IL/Li) molar ratio was 1.5.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Example 8: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), 18% by weight of poly(ethylene glycol) dimethyl ether (PEGDME, ≥99% HPLC grade, number average molecular weight Mn=250 Da, Sigma Aldrich Corporation), and 10% by weight of SiO$_2$ having an average particle diameter of 7 nm were added to the second solution to prepare a mixture. The ionic liquid/lithium ion (IL/Li) molar ratio was 1.5.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 1: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 2: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI) was added to the second solution to prepare a mixture. The ionic liquid/lithium ion (IL/Li) molar ratio was 0.1.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 3: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI) and 5% by weight of SiO$_2$ having an average particle diameter of 7 nm were added to the second solution to prepare a mixture. In this example, the ionic liquid/lithium ion (IL/Li) molar ratio was 0.1.

The mixture was stirred at room temperature for 24 hours and sonicated to uniformly disperse SiO$_2$ particles. After the sonication process, the mixture was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 4: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethane-sulfonyl)imide (PYR$_{14}$TFSI, ≥98% HPLC grade, number average molecular weight Mn=422.41 Da, C-TRI) was added to and dissolved in the second solution so that an ionic liquid/lithium ion (IL/Li) molar ratio was 0.2 to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 5: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethane-sulfonyl)imide (PYR$_{14}$TFSI, ≥98% HPLC grade, number average molecular weight Mn=422.41 Da, C-TRI) was added to and dissolved in the second solution so that an ionic liquid/lithium ion (IL/Li) molar ratio was 0.4 to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 6: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethane-sulfonyl)imide (PYR$_{14}$TFSI, ≥98% HPLC grade, number average molecular weight Mn=422.41 Da, C-TRI) was added to and dissolved in the second solution so that an ionic liquid/lithium ion (IL/Li) molar ratio was 1.0 to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 7: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethane-sulfonyl)imide (PYR$_{14}$TFSI, ≥98% HPLC grade, number average molecular weight Mn=422.41 Da, C-TRI) was added to and dissolved in the second solution so that an ionic liquid/lithium ion (IL/Li) molar ratio was 1.5 to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 8: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution such that an ethylene oxide/lithium ion (EO/Li) molar ratio was 20 to prepare a second solution.

N-butyl-N31methylpyrrolidinium bis 3-trifluoromethane-sulfonyl)imide (PYR$_{14}$TFSI, ≥98% HPLC grade, number average molecular weight Mn=422.41 Da, C-TRI) was added to and dissolved in the second solution such that an ionic liquid/lithium ion (IL/Li) molar ratio was 2.0.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 9: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

18% by weight of poly(ethylene glycol) dimethyl ether (PEGDME, ≥99% HPLC grade, number average molecular weight Mn=250 Da, Sigma Aldrich Corporation) was added to and dissolved in the second solution to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 µm.

Comparative Example 10: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

30% by weight of poly(ethylene glycol) dimethyl ether (PEGDME, ≥99% HPLC grade, number average molecular weight Mn=250 Da, Sigma Aldrich Corporation) was added to and dissolved in the second solution to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 µm.

Comparative Example 11: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

5% by weight of $SiO_2$ having an average particle diameter of 7 nm was added to the second solution to prepare a mixture The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 µm.

Comparative Example 12: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

10% by weight of poly(ethylene glycol) dimethyl ether (PEGDME, ≥99% HPLC grade, number average molecular weight Mn=250 Da, Sigma Aldrich Corporation), and 5% by weight of $SiO_2$ having an average particle diameter of 7 nm were added to the second solution to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 µm.

Comparative Example 13: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

18% by weight of poly(ethylene glycol) dimethyl ether (PEGDME, ≥99% HPLC grade, number average molecular weight Mn=250 Da, Sigma Aldrich Corporation), and 5% by weight of $SiO_2$ having an average particle diameter of 7 nm were added to the second solution to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 µm.

Comparative Example 14: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide ($PYR_{14}TFSI$, ≥98% HPLC grade, number average molecular weight Mn=422.41 Da, C-TRI), and 5% by weight of $SiO_2$ having an average particle diameter of 7 nm were added to the second solution to prepare a mixture. In this regard, the ionic liquid/lithium ion (IL/Li) molar ratio was 0.1.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 µm.

Comparative Example 15: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), and 5% by weight of SiO$_2$ having an average particle diameter of 7 nm were added to the second solution to prepare a mixture. In this regard, the ionic liquid/lithium ion (IL/Li) molar ratio was 0.8.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 16: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), and 5% by weight of SiO$_2$ having an average particle diameter of 7 nm were added to the second solution to prepare a mixture. The ionic liquid/lithium ion (IL/Li) molar ratio was 1.5.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 17: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

N-butyl-N31methylpyrrolidinium bis 3-trifluoromethanesulfonyl)imide (PYR$_{14}$TFSI, ≥98% HPLC grade, number average molecular weight Mn=422.41 Da, C-TRI), and 5% by weight of SiO$_2$ having an average particle diameter of 7 nm were added to the second solution to prepare a mixture. The ionic liquid/lithium ion (IL/Li) molar ratio was 2.0.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Comparative Example 18: Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a first solution.

Lithium trifluoromethanesulfonimide (LiTFSI) powder was added to and dissolved in the first solution so that an ethylene oxide/lithium ion (EO/Li) molar ratio was 20 to prepare a second solution.

5% by weight of SiO$_2$ having an average particle diameter of 7 nm were added to the second solution to prepare a mixture.

The mixture was stirred at room temperature for 24 hours and cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. The thickness of the layer was 40 μm.

Components of the electrolytes prepared according to Examples 1 to 8, and Comparative Examples 1 to 18 are listed in Table 1 below.

TABLE 1

| Example | Component | | | |
|---|---|---|---|---|
| | Lithium salt | Ionic liquid (IL) | Oligomer | Inorganic particle (NP) |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Comparative Example 1 | ○ | — | — | — |
| Comparative Example 2 | ○ | ○ | — | — |
| Comparative Example 3 | ○ | ○ | — | ○ |
| Comparative Example 4 | ○ | ○ | — | — |
| Comparative Example 5 | ○ | ○ | — | — |
| Comparative Example 6 | ○ | ○ | — | — |
| Comparative Example 7 | ○ | ○ | — | — |
| Comparative Example 8 | ○ | ○ | — | — |
| Comparative Example 9 | ○ | — | ○ | — |
| Comparative Example 10 | ○ | — | ○ | — |
| Comparative Example 11 | ○ | — | — | ○ |
| Comparative Example 12 | ○ | — | ○ | ○ |
| Comparative Example 13 | ○ | — | ○ | ○ |
| Comparative Example 14 | ○ | ○ | — | ○ |
| Comparative Example 15 | ○ | ○ | — | ○ |
| Comparative Example 16 | ○ | ○ | — | ○ |
| Comparative Example 17 | ○ | ○ | — | ○ |
| Comparative Example 18 | ○ | — | — | ○ |

Analysis Example 1: Analysis of Structure of Electrolyte

The electrolytes prepared according to Example 1 and Comparative Examples 1 and 2 were subjected to small angle X-ray scattering (SAXS) experiments to analyze structures of the electrolytes. The results are shown in FIGS. 4A to 4C.

Figure 4A:
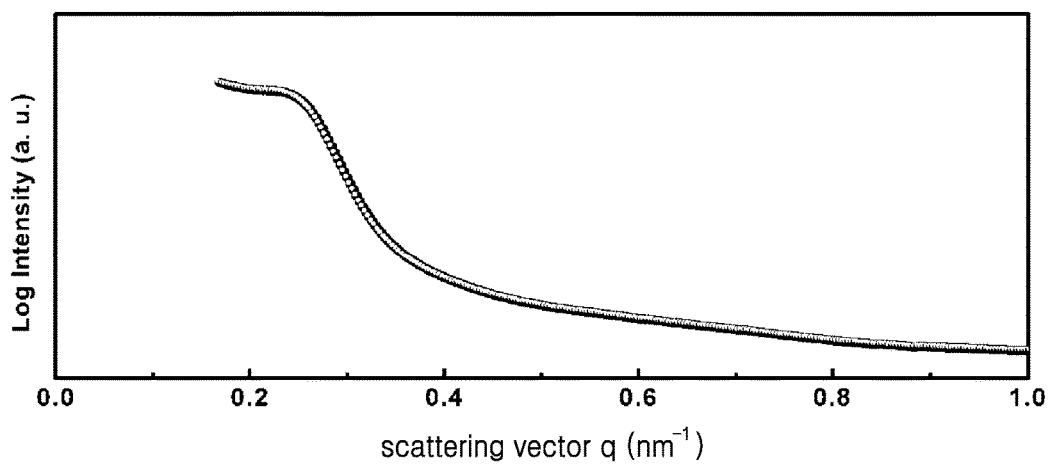
FIG. 4A is a graph of logarithm of intensity (arbitrary units, a. u.) versus scattering vector (reverse nanometers, $nm^{-1}$) illustrating structural analysis results of an electrolyte according to Example 1 obtained by performing a small angle X-ray scattering (SAXS) experiment.
Figure 4B:
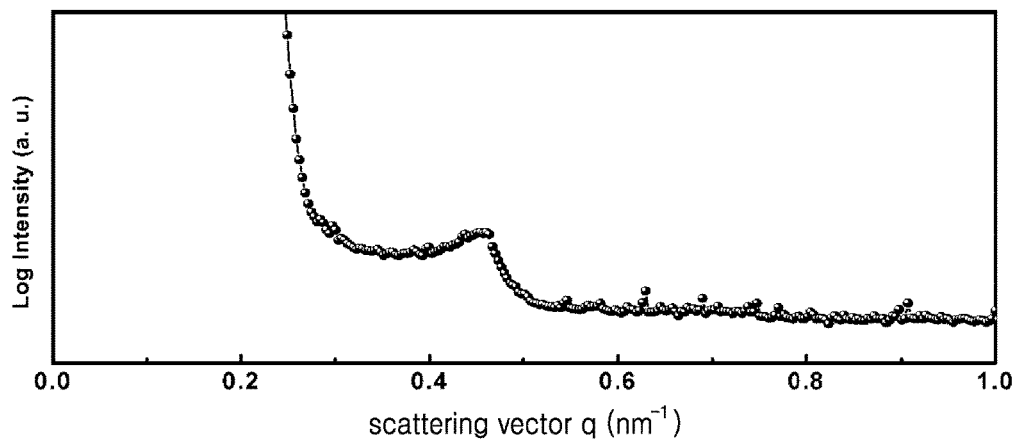
FIG. 4B is a graph of logarithm of intensity (arbitrary units, a. u.) versus scattering vector (reverse nanometers, $nm^{-1}$) illustrating structural analysis results of an electrolyte according to Comparative Example 1 obtained by performing an SAXS experiment.
Figure 4C:
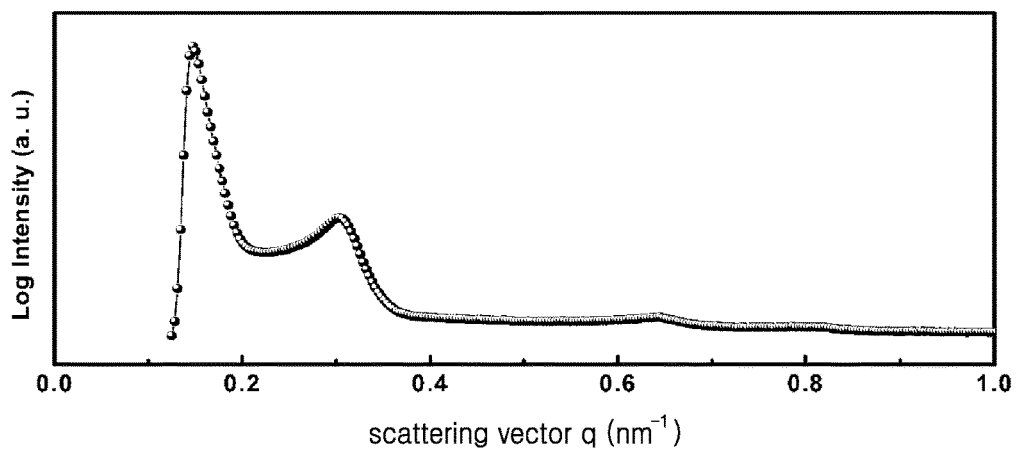
FIG. 4C is a graph of logarithm of intensity (arbitrary units, a. u.) versus scattering vector (reverse nanometers, $nm^{-1}$) illustrating structural analysis results of an electrolyte according to Comparative Example 2 obtained by performing an SAXS experiment.

In FIGS. 4A to 4C, filled inverted triangles indicate Bragg peaks of the first domain contained in the block copolymer of each electrolyte. Here, q is a scattering vector. The size $D_1$ of the first domain may be obtained by substituting q in Equation 1 below.

$$D_1 = 2\pi/q \qquad \text{Equation 1}$$

In the electrolytes prepared according to Example 1 and Comparative Examples 1 and 2, q values were about 0.24, 0.46, and 0.303, respectively. In the electrolytes prepared according to Example 1 and Comparative Examples 1 and 2, the sizes $D_1$ of the first domains calculated by using Equation 1 were about 26.1 nm, 13.6 nm, and 20.7 nm, respectively. Accordingly, it is confirmed that the size $D_1$ of the first domain of the electrolyte according to Example 1 is greater than those of the electrolytes according to Comparative Examples 1 and 2 and is equal to or greater than 22 nm.

Evaluation Example 1: Evaluation of Ion Conductivity, Interface Resistance, and Lithium Ion Mobility

Evaluation Example 1-1: Evaluation of Ion Conductivity and Interface Resistance Cells were prepared by forming shielding electrodes on both surfaces of each of the electrolytes prepared according to Examples 7 and 8 and Comparative Examples 1, 4 to 6, and 9 to 15 by using stainless steel (SUS). AC impedance of each sample on which the electrodes are formed was measured using a Solatron SI1260 impedance/gain-phase analyzer by using a 4-probe method. A frequency range was about 0.1 Hertz (Hz) to about 1 mega Hertz (MHz), and an amplitude voltage was 10 milli Volts (mV). The AC impedance was measured under ambient conditions at 25° C. Resistance was calculated from an arc of a Nyquist plot with respect to measurements of impedance, and ion conductivity σ was calculated by using Equation 3 below. The results are shown in Table 2 and FIGS. 5A and 5B.

$$\sigma = I/R \cdot A \qquad \text{Equation 3}$$

In Equation 2,
σ: ion conductivity (Siemens per meter, S/m),
R: resistance,
I: thickness of electrolyte layer, and
A: area of electrode

TABLE 2

| Example | Ion conductivity (S/cm) |
| --- | --- |
| Example 7 | $1.38 \times 10^{-4}$ |
| Example 8 | $1.20 \times 10^{-4}$ |
| Comparative Example 1 | $1.50 \times 10^{-6}$ |
| Comparative Example 4 | $3.14 \times 10^{-6}$ |
| Comparative Example 5 | $6.60 \times 10^{-6}$ |
| Comparative Example 6 | $6.20 \times 10^{-6}$ |
| Comparative Example 9 | $2.55 \times 10^{-6}$ |
| Comparative Example 10 | $4.10 \times 10^{-6}$ |
| Comparative Example 11 | $1.45 \times 10^{-6}$ |
| Comparative Example 12 | $1.88 \times 10^{-6}$ |
| Comparative Example 13 | $2.25 \times 10^{-6}$ |
| Comparative Example 14 | $2.20 \times 10^{-6}$ |
| Comparative Example 15 | $3.07 \times 10^{-5}$ |

Referring to Table 2, ion conductivity of the electrolytes according to Examples 7 and 8 at 25° C. was greater than ion conductivity of the electrolytes according to Comparative Examples 1, 4 to 6, and 9 to 15 at 25° C. More particularly, ion conductivity of the electrolytes according to Examples 7 and 8 at 25° C. was maintained at $1 \times 10^{-4}$ S/cm or greater and was about 10 times greater than ion conductivity of the electrolytes according to Comparative Examples 1, 4 to 6, and 9 to 15 at 25° C.

Figure 5A:
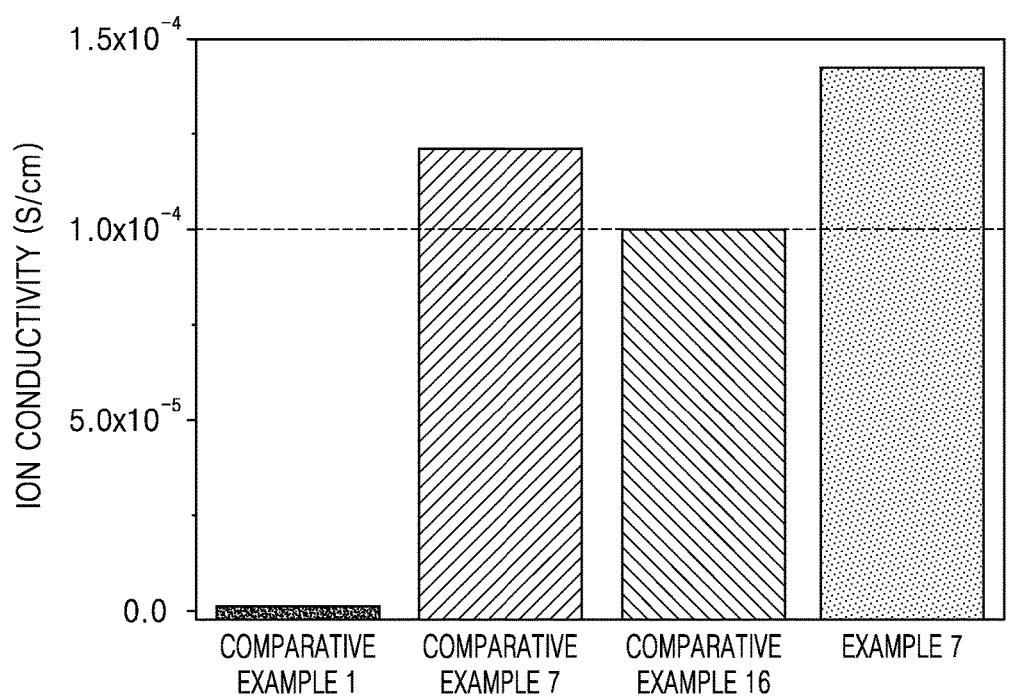
FIG. 5A is a diagram illustrating ion conductivity (Siemens per centimeter, S/cm) of electrolytes according to Example 7 and Comparative Examples 1 to 3 measured by impedance spectroscopy at 25° C.
Figure 5B:
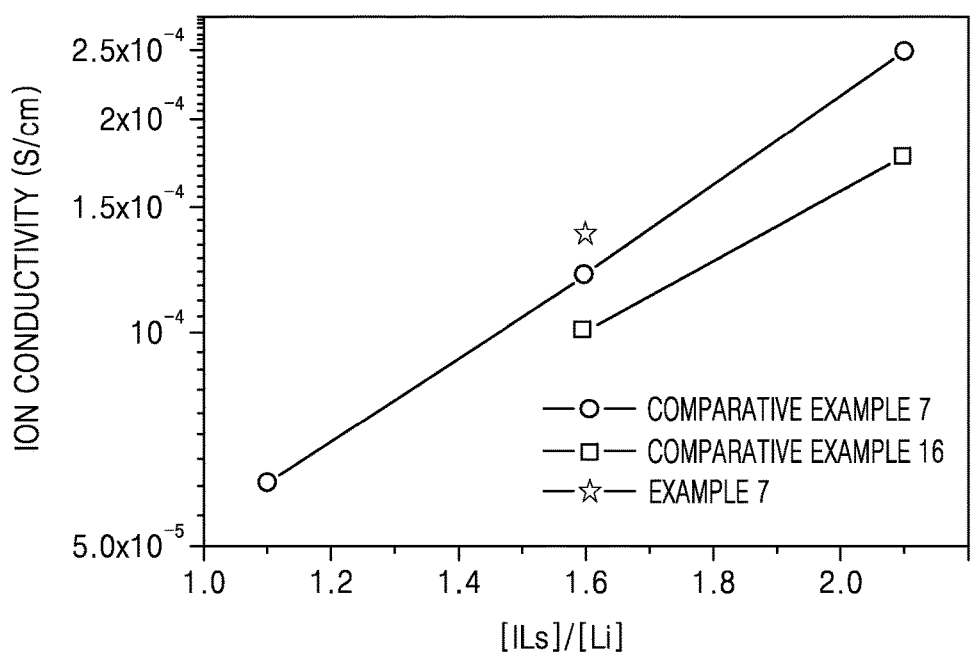
FIG. 5B is a graph of ion conductivity (Siemens per centimeter, S/cm) versus an ionic liquid/lithium ion ([IL]/

Referring to FIGS. 5A and 5B, it was confirmed that ion conductivity of the electrolyte according to Example 7 at 25° C. was greater than ion conductivity of the electrolytes according to Comparative Examples 1, 7, and 16 at 25° C. Meanwhile, based on the results of ion conductivity of the electrolytes according to Example 7 and Comparative Examples 7 and 16, it is confirmed that ion conductivity increases as the ionic liquid/lithium ion (IL/Li) molar ratio increases in the electrolyte including the ionic liquid.

In addition, interface resistance of the electrolytes according to Example 7 and Comparative Examples 1, 7, 9, and 11 at 60° C. was measured in the same manner as described above. The results are shown in FIG. 6.

Referring to FIG. 6, it is confirmed that interface resistance of the electrolyte according to Example 7 is lower than that of the electrolytes according to Comparative Examples 1, 7, 9, and 11. Particularly, interface resistance of the electrolyte according to Example 7 is about 100 ohms and is decreased to greater than about a half of interface resistance of the electrolyte according to Comparative Example 1. Accordingly, it may be understood that growth of lithium dendrite may be inhibited from the surface of the negative electrode of the lithium battery.

Evaluation Example 1-2: Evaluation of Lithium Ion Mobility

Lithium ion mobility of the electrolytes prepared according to Example 7 and Comparative Examples 1, 7, 9, and 11 was calculated using ion conductivity at 60° C., direct current (DC) polarization, and alternating current (AC) impedance of the electrolytes according to Example 7 and Comparative Examples 1, 7, 9, and 11 through Equation 4-1, particularly, Equation 4-2 below. The results are shown in FIG. 7.

$$t_{Li}^+ = t_{cation}/(t_{cation} + t_{anion}) \qquad \text{Equation 4-1}$$

In Equation 4-1, the "$(t_{cation} + t_{anion})$" refers to a sum of the numbers of cations and anions among the components contained in the electrolyte, and the "$t_{cation}$" refers to the number of cations among the components contained in the electrolyte.

$$t_{Li^+} = \frac{i_{ss}(\Delta V - i_0 R^0)}{i_0(\Delta V - i_{ss} R^{ss})} \qquad \text{Equation 4-2}$$

In Equation 4-2,
$t_{Li}^+$ is lithium ion mobility,
$i_0$ is initial current,
$i_{ss}$ is final current,
$R^0$ is cell resistance before the polarization, and
$R^{ss}$ is cell resistance after the polarization.
$\Delta V = 10$ mV was substituted into Equation 4-2.

Referring to FIG. 7, it is confirmed that lithium ion mobility of the electrolyte according to Example 7 is greater than lithium ion mobility of the electrolytes according to Comparative Examples 1, 7, 9, and 11. That is, it may be considered that the electrolyte according to Example 7 has more stable lithium ion mobility.

Evaluation Example 2: Evaluation of Mechanical Properties

Mechanical properties of the electrolytes according to Examples 1 and 6 and Comparative Example 16 were evaluated using a DMA800 testing machine manufactured by TA Instruments. Experiments were performed under atmospheric conditions at 25° C. Samples had a width of 0.5 centimeters (cm), a length of 40 cm, and a thickness of 40 µm. Elongation was 1.2 millimeters per minute (mm/min). The results are shown in Table 3 below.

TABLE 3

| Example | Young's modulus (MPa) |
|---|---|
| Example 1 | 9.0 |
| Example 6 | 6.6 |
| Comparative Example 16 | 5.5 |

Tensile strength of the electrolytes according to Examples 1 and 6 was measured. Referring to Table 3, since the Young's modulus of the electrolyte including all of the block copolymer, the ionic liquid, the oligomer, the inorganic particle, and the lithium salt is equal to or greater than 1.0 MPa, it is confirmed that mechanical properties of the electrolyte is maintained.

In addition, the Young's moduli of the electrolytes according to Example 1 and Example 6 were greater than the Young's modulus of the electrolyte according to Comparative Example 16.

Thus, it is confirmed that mechanical properties of the electrolyte including all of the block copolymer, the ionic liquid, the oligomer, the inorganic particle, and the lithium salt were improved.

Evaluation Example 3: Evaluation of Electrochemical Stability

Cells were prepared by forming shielding electrodes on both surfaces of each of the electrolytes prepared according to Example 2 and Comparative Examples 1, 3, 13, and 18 by using Li/electrolyte/SUS electrodes. Electrochemical stability of the cells was evaluated by linear sweep voltammetry (LSV). The results are shown in FIG. 8. Conditions for LSV include a voltage of about 0 V to about 6 V and a scan rate of about 1 milli Volts per second (mV/s) at 60° C.

Referring to FIG. 8, it is confirmed that a cell including the electrolyte according to Example 2 has better electrochemical stability than cells including the electrolytes according to Comparative Examples 1, 3, 13, and 18.

Evaluation Example 4: Evaluation of Lifespan Characteristics

Cells were prepared by forming shielding electrodes on both surfaces of each of the electrolytes prepared according to Example 1 and Comparative Example 1 by using lithium metal. Lifespan characteristics of the cells were evaluated by performing cycle characteristics experiments at 0.01 milli Amperes (mA) and at 60° C. The results are shown in FIGS. 9A and 9B.

Referring to FIGS. 9A and 9B, the cell including the electrolyte according to Example 1 maintained the voltage for 200 cycles. However, the cell including the electrolyte according to Comparative Example 1 maintained the voltage for 60 cycles. Accordingly, it is confirmed that the cell including the electrolyte according to Example 1 has a lifespan about 3 times longer than a lifespan of the cell including the electrolyte according to Comparative Example 1.

As described above, according to the one or more of the above embodiments, the electrolyte has high ion conductivity and excellent mechanical properties at room temperature, and the lithium battery or lithium metal battery including the electrolyte may have improved electrochemical stability and lifespan characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present inventive concept as defined by the following claims.

What is claimed is:

1. An electrolyte comprising:
   a block copolymer comprising a first domain and a second domain covalently linked to the first domain;
   an ionic liquid comprising at least one cation selected from a pyrrolidinium cation, a pyridinium cation, an imidazolium cation, a piperidinium cation, an ammonium cation, and an alkylammonium cation;
   an oligomer;
   an inorganic particle; and
   a lithium salt,
   wherein the first domain comprises an ion conductive polymer block, and the second domain comprises a non-conducting polymer block,
   wherein the ionic liquid, the oligomer, the inorganic particle, and the lithium salt are introduced into the first domain, and
   wherein an ionic liquid to lithium ion molar ratio is in a range of about 0.1 to about 2.0.

2. The electrolyte of claim 1, wherein a size $D_1$ of the first domain calculated according to Equation 1 is greater than a size $D_2$ of the second domain, calculated according to Equation 1:

$$D_1 = 2\pi/q_1 \qquad \text{Equation 1}$$

wherein $q_1$ is a first domain scattering vector determined by transmission electron microscopy small angle X-ray scattering $$D_2 = 2\pi/q_2 \qquad \text{Equation 2,}$$

wherein $q_2$ is a second domain scattering vector determined by transmission electron microscopy small angle X-ray scattering.

3. The electrolyte of claim 1, wherein a size $D_1$ of the first domain is in a range of about 22 nanometers to about 100 nanometers.

4. The electrolyte of claim 1, wherein a number average molecular weight Mn of the ion conductive polymer block comprised in the first domain is 10,000 Daltons or greater.

5. The electrolyte of claim 1, wherein a number average molecular weight of the non-conducting polymer block comprised in the second domain is 10,000 Daltons or greater.

6. The electrolyte of claim 1, wherein an amount of the non-conducting polymer block comprised in the second domain is in a range of about 20 percent by weight to about 45 percent by weight based on a total weight of the block copolymer.

7. The electrolyte of claim 1, wherein the block copolymer comprises a linear block copolymer, a branched block copolymer, or a combination thereof.

8. The electrolyte of claim 1, wherein the block copolymer comprises at least one of a linear diblock copolymer A-B and a linear triblock copolymer A-B-A';
wherein the blocks A and A' are the same or different and are each independently an ion conductive polymer block selected from a polyethylene oxide block, a polysiloxane block, a polypropylene oxide block, a polyethylene oxide-grafted polymethylmethacrylate block, a polypropylene oxide-grafted polymethylmethacrylate block, a poly(dialkylsiloxane-co-ethylene oxide) block, a poly(dialkylsiloxane-co-propylene oxide) block, and a polysiloxane-grafted PMMA block; and
wherein the block B is a non-conducting polymer block selected from a polystyrene block, a PMMA block, a polyvinylpyridine block, a polyimide block, a polyethylene block, a polypropylene block, a polyvinylidene fluoride block, a polyacrylonitrile block, and a polydimethylsiloxane block.

9. The electrolyte of claim 1, wherein the ionic liquid further comprises at least one anion selected from bis(trifluoromethylsulfonyl)imide, bromide, chloride, dicyanamide, hexafluorophosphate, phosphate, sulfate, iodide, sulfonate, nitrate, tetrafluoroborate, thiocyanate, and triflate.

10. The electrolyte of claim 1, wherein the oligomer comprises an ethylene oxide repeating unit and has a number average molecular weight of about 200 Daltons to about 2,000 Daltons.

11. The electrolyte of claim 1, wherein a content of the oligomer is in a range of about 5 percent by weight to about 50 percent by weight based on a total weight of the electrolyte.

12. The electrolyte of claim 1,
wherein the inorganic particle is dispersible in the first domain and
wherein the inorganic particle comprises at least one nanoparticle selected from $SiO_2$, $TiO_2$, ZnO, $Al_2O_3$, $BaTiO_3$, and a metal-organic framework.

13. The electrolyte of claim 1, wherein a content of the inorganic particle is in a range of about 1 percent by weight to about 40 percent by weight based on a total weight of the electrolyte.

14. The electrolyte of claim 1, wherein the lithium salt comprises at least one selected from lithium trifluoromethanesulfonimide, $LiBF_4$, $LiPF_6$, lithium bis[1, 2-oxalato 2+O, O'] borate, and $LiClO_4$.

15. The electrolyte of claim 1, further comprising an organic solvent, a homopolymer, or a combination thereof.

16. The electrolyte of claim 1, wherein the electrolyte is a gel phase layer or a solid phase layer.

17. The electrolyte of claim 16, wherein the gel phase layer or the solid phase layer has a thickness equal to or less than 100 micrometers.

18. The electrolyte of claim 1, wherein the electrolyte has an ion conductivity of $1 \times 10^{-4}$ Siemens per centimeter or greater at 25° C.

19. The electrolyte of claim 1, wherein the electrolyte has a Young's modulus of 1.0 mega Pascals or greater.

* * * * *